No Printed Specification Available
7363X
P. Newell.
Loom Temple.
Patented Jan. 5, 1833.
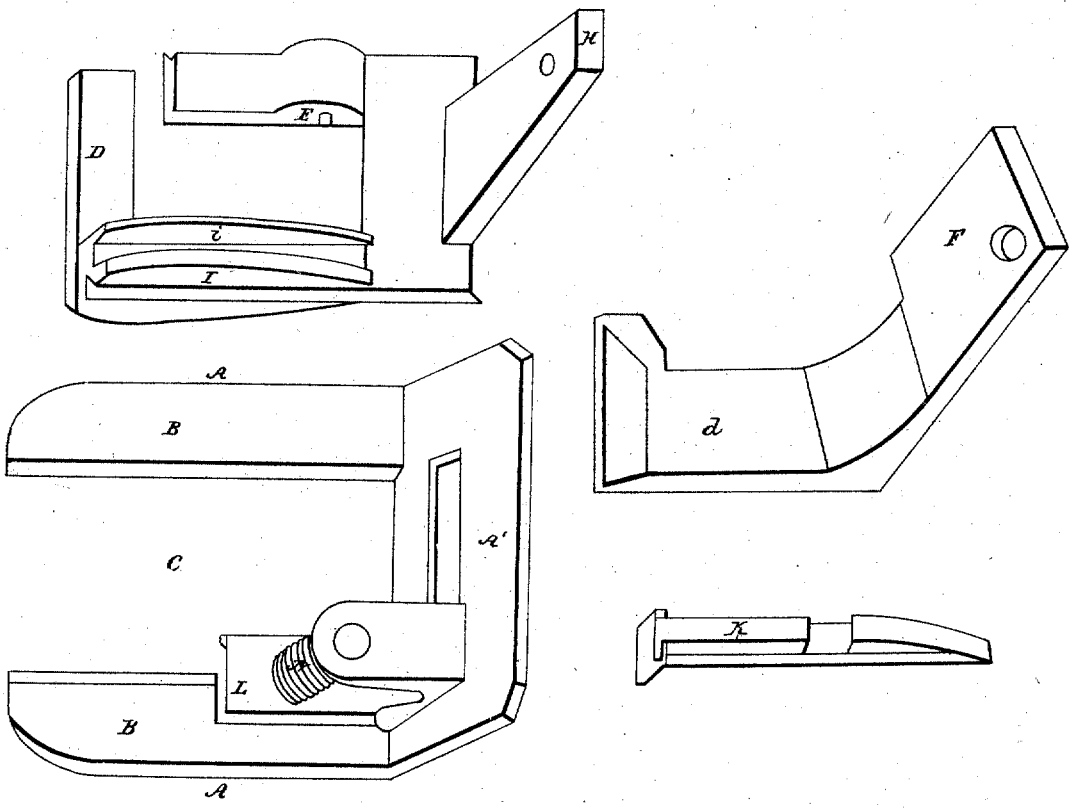
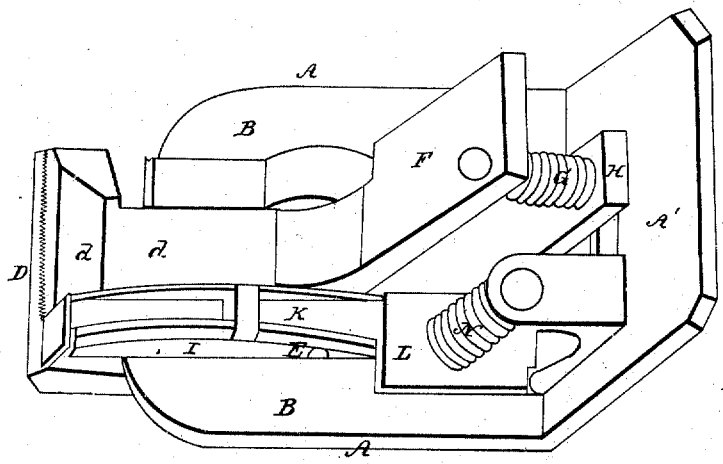
N. PETERS, PHOTO-LITHOGRAPHER, WASHINGTON, D. C.

1/5/1833 1363X

Peter Newell of Waterford, New York
No 96.
Letters Patent.
Issued January 5. 1833, [illegible] December 2, 1836
The Schedule referred to in these Letters Patent and making
Part of the same.

To all to whom these presents shall come.
Be it known that I, Peter Newell, of the town of Waterford in the
County of Saratoga, and State of New York, have invented a new and
useful improvement in the Temple for weaving cloth and that the
following is a full and exact description of the construction and op=
eration of the said Machine as improved by me, reference being had
to the annexed drawings of the same making part of this specification
First. The frame A. of the said Machine is made of iron
or any Metallic or other suitable substance constructed with two
guides BB. about four inches long and about three fourths of an inch
in width leaving a space C. between them of sufficient width to
receive the jaws D. d. of the temple, hereafter described. The guides
BB. are connected with and rest upon, a support A. of the same sub-
stance at right angles to the guides and usually in one piece with it
which support is fastened to the Loom by a bolt or otherwise.
Second. The jaws D. d. of the temple are made of iron or any other
suitable substance. The upper jaw D. is constructed about four inches
in length and about two inches in width. The under jaw d. is about
two inches and a half long & one inch wide & connected with the
upper jaw by means of a rivet E. passing through at a suitable dis-
tance from the Mouth. At right angles with the lower jaw & connected
therewith is a projection F. about two inches in length & one inch in
breadth, against which the Lathe of the weaving Loom strikes at
every revolution and thereby opens the jaws of the temple suf-
ficiently wide to allow the cloth to pass. The jaws of the Temple
are closed by means of a spring G. fastened to the back part of of the upper jaw & resting against the projection I. of the lower jaw
on the under side of the upper jaw and near the outer edge thereof
are situated two ribs i. i. between which is a slide K. about two &
one half inches in length projecting out about one eighth of an inch
from the mouth of the jaws which prevents any possible injury to the
reeds of the loom when the filling is spent. The shuttle or reed on
when the filling is spent striking the end of the slide K. which is so
connected with a joint arm L. hereinafter described as to raise it
clear from the shoulder and permit the jaws of the temple to recede
so far as to prevent the reeds from striking them. The jaws are kept
in their place by means of a joint arm L. the one end of which is
fastened to the support of the frame & the other end resting against
the shoulder of the rib & is kept in its place by means of a spring l.

Having thus fully described the construction and operation of the
temple for which I ask Letters Patent, I do declare that I do not
claim the individual parts composing the same generally, such for
instance as the jaws of the spiral, or other springs; but I do claim the
use of sliding jaws which hold the selvage, when made upon the
principle and operating in the manner, of those marked D. d.
in the accompanying drawing. I do not claim the making use
of a temple having jaws, similar to those used by me & also having
a yielding motion this having been previously done but by the
employment of means essentially different from that herein described,
as for example, in the instrument well known among manufacturers under
the name of Stillman's temple, but I do claim the combination of the
respective parts of this instrument with each other in which the
jaws and their appendages are made to slide, by means of guide
pieces, and are operated upon by springs, substantially as herein
set forth. I also claim as new the use of a slide operating
in the manner of that marked K. in the accompanying drawing
effecting a receding motion of the jaws upon the principle set forth
for the purpose of preventing any injury to the reed, the temple
or the shuttle, in case of the stopping of the shuttle between the reed and and the temple. And I do further declare that I do not intend by the foregoing description and claims, to limit myself to any particular measurement or precise form of the respective parts of this instrument, but to vary these as I may think proper so whilst the principle of action remains unchanged." Exd.

Witnesses
Thos. P. Jones
A. G. Stevens. Peter Sewell [illegible]

Dr. in port folio

884 Words